United States Patent [19]

Graiver et al.

[11] Patent Number: 4,710,405

[45] Date of Patent: Dec. 1, 1987

[54] ADHESION OF SILICONE ELASTOMERS OBTAINED FROM AQUEOUS EMULSION

[75] Inventors: Daniel Graiver, Midland; Robert E. Kalinowski, Auburn, both of Mich.

[73] Assignee: Dow Corning Corporation, Midland, Mich.

[21] Appl. No.: 899,847

[22] Filed: Aug. 25, 1986

[51] Int. Cl.$^4$ .............................................. B05D 5/10
[52] U.S. Cl. ...................................... 427/387; 528/35
[58] Field of Search ......................................... 427/387

[56] References Cited

U.S. PATENT DOCUMENTS

| | | | |
|---|---|---|---|
| 3,294,725 | 12/1966 | Findlay et al. | 528/35 |
| 3,817,894 | 6/1974 | Butler et al. | 260/29.2 M |
| 3,876,459 | 4/1975 | Burrill | 427/387 |
| 3,962,500 | 6/1976 | Smith | 427/387 |
| 4,221,688 | 9/1980 | Johnson et al. | 525/119 |
| 4,228,054 | 10/1980 | Ona et al. | 260/29.2 M |
| 4,311,737 | 1/1982 | Ishizaka et al. | 427/387 |
| 4,409,267 | 10/1983 | Inchinoke et al. | 427/387 |
| 4,412,035 | 10/1983 | Kurita | 524/796 |
| 4,471,007 | 9/1984 | Pate | 427/387 |
| 4,496,687 | 1/1985 | Okada et al. | 524/859 |
| 4,535,109 | 8/1985 | Kondo et al. | 524/188 |

FOREIGN PATENT DOCUMENTS

| | | |
|---|---|---|
| 862183 | 1/1971 | Canada . |
| 8369250 | 4/1983 | Japan . |
| 2152521 | 8/1985 | United Kingdom . |

Primary Examiner—Thurman K. Page
Assistant Examiner—Leon R. Horne
Attorney, Agent, or Firm—Edward C. Elliott

[57] ABSTRACT

A method of improving the adhesion of silicone elastomers, obtained from aqueous emulsions, comprises mixing the emulsion with an amine functional co-oligomer. A preferred co-oligomer is of the formula

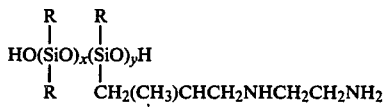

where R is a monovalent alkyl radical of from 1 to 6 carbon atoms, x is from 1 to 250, and y is from 2 to 50.

6 Claims, No Drawings

ADHESION OF SILICONE ELASTOMERS OBTAINED FROM AQUEOUS EMULSION

BACKGROUND OF THE INVENTION

1. Field of the Invention

This invention relates to silicone aqueous emulsions which yield an elastomer upon removal of the water.

2. Background Information

Silicone aqueous emulsions of various types have been disclosed over the years. For example, Canadian Pat. No. 862,183, issued Jan. 26, 1971, discloses a composition and process for treating fiber glass to impart a firmer hand. The composition consists essentially of a liquid hydroxy endblocked dimethylsiloxane polymer, a silane of the formula $R_nSiR'_{4-n}$ wherein R is a hydrocarbon or substituted hydrocarbon radical containing from 1 to 20 carbon atoms, and a siloxane condensation catalyst. Included in a long list of suitable R radicals on the silane are amino containing ones. There is no criticality assigned to the choice of radical or to the method of emulsification.

A composition useful as a caulk is described in U.S. Pat. No. 3,817,894, issued June 18, 1974. The composition consists essentially of a siloxane copolymer, water, a filler, surfactants, and an aminofunctional silane. The aminofunctional silane is stated to function as a crosslinking agent and as curing catalyst for the siloxane copolymer.

An organopolysiloxane latex composition crosslinked by organofunctional trialkoxysilanes are useful for binding fiber glass fibers as disclosed in U.S. Pat. No. 4,228,054, issued Oct. 14, 1980. The composition is prepared by dissolving a surfactant in water, adding a cyclic organosiloxane and the organofunctional trialkoxysilane, then emulsifying and heating to obtain a high molecular weight organopolysiloxane, which is cooled and neutralized to give the product.

Japanese Kokai publication No. 83-69250, published Apr. 25, 1983, describes a silicone aqueous emulsion composition which consists of (A) an anionic silicone emulsion, (B) a homogeneous dispersion of amino-functional silane or partial hydrolyzate and colloidal silica, and (C) a curing catalyst. The aminofunctional silane is of the formula $R''Si(OR')_{4-n}$ where R'' is amino-functional, R' is an alkyl, acyl, etc. group, and n is 1,2,3, or 4.

U.S. Pat. No. 4,496,687, issued Jan. 29, 1985, describes an organopolysiloxane-containing aqueous emulsion composition prepared by blending (A) an aqueous emulsion of an organopolysiloxane having silicon-bonded hydroxy groups and emulsified in water by use of an anionic surface active agent, (B) a mixture of a reaction product of a carboxylic acid anhydride with an amino-functional organosilane and a colloidal silica in the form of an aqueous emulsion and (C) a curing catalyst. The composition is stated to be very stable and storable over a long period of time. It cures into a rubbery elastomer having good adhesion to the surface of the substrate on which it is dried and cured.

U.S. Pat. No. 4,412,035, issued Oct. 25, 1983, relates to a silicone cationic emulsion composition of a polydiorganosiloxane containing amino, epoxy, and hydroxy groups as functional groups, and which may be used as a releasing agent, stripping agent, paint component, and anti-foaming agent. A reaction product of a silanol containing polydiorganosiloxane, an amine functional silane, and an epoxy functional silane is emulsion polymerized with a cyclic siloxane, a quaternary ammonium salt surfactant and water.

British patent application No. 2,152,521 A, published Aug. 7, 1985, discloses a method for producing aminoalkylsiloxane polymers of high molecular weight by hydrolyzing a difunctional aminoalkylsilane prior to reaction with hydroxy terminated siloxane oligomers.

U.S. Pat. No. 4,535,109, issued Aug. 13, 1985, describes a method of producing silicone aqueous emulsion compositions. The method prepares an emulsion of polydiorganosiloxane, colloidal silica, curing catalyst, emulsifier, and water. After a period of ripening, an amino-functional silane or its partial hydrolyzate is added to give superior gloss, good adhesion to substrates, and a rustproof coating.

SUMMARY OF THE INVENTION

The adhesion of a silicone elastomer, obtained by drying an emulsion, is improved by the addition of an amine functional polydiorganosiloxane co-oligomer. The amine functional polydiorganosiloxane co-oligomer is of the formula

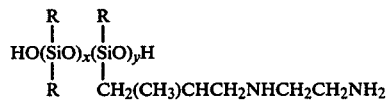

where R is a monovalent alkyl radical of from 1 to 6 carbon atoms, x is from 1 to 250, and y is from 2 to 50. The quantity of this amine functional polydiorganosiloxane co-oligomer required to provide adhesion of the silicone elastomer to a substrate upon which it is dried can be as low as 0.01 part based upon 100 parts of the silicone polydiorganosiloxane in the emulsion to which it is added.

It is an object of this invention to improve the adhesion of a silicone elastomer to a substrate, the elastomer being formed by drying an emulsion of the elastomer, at ambient conditions, upon the substrate.

DESCRIPTION OF THE INVENTION

This invention relates to a method of improving the adhesion of silicone elastomers, obtained from aqueous emulsion, to substrates comprising mixing (A) an anionically polymerized polydiorganosiloxane, in the form of an emulsion that cures into a silicone elastomer upon removal of the water, and (B) an amine functional polydiorganosiloxane co-oligomer, then applying the mixture to a substrate and allowing to dry, to give a silicone elastomer adhered to the substrate in a cohesive manner. The amine functional polydiorganosiloxane co-oligomer (B) is preferably of the formula

where R is a monovalent alkyl radical of from 1 to 6 carbon atoms, x is from 1 to 250, and y is from 2 to 50.

There are a number of silicone elastomer emulsions known in which a silicone elastomer is produced by removing the water from the emulsion at room temperature. Examples of such emulsions are those described in U.S. Pat. No. 4,221,688, issued Sept. 9, 1980 to Johnson et al., No. 4,244,849, issued Jan. 13, 1981 to Saam, No. 4,248,751, issued Feb. 3, 1981 to Willing, No. 4,273,634, issued June 16, 1981 to Saam et al., and No. 4,568,718, issued Feb. 4, 1986 to Huebner et al., all of which are hereby incorporated by reference to show anionically polymerized polydiorganosiloxane, in the form of an emulsion that cures into a silicone elastomer upon removal of the water. A preferred emulsion (A) comprises a silicone emulsion suitable to provide an elastomeric product upon removal of the water under ambient conditions comprising a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, said silicone emulsion having a pH in the range of 9 to 11.5 inclusive.

One such emulsion is that described by Johnson et al. in U.S. Pat. No. 4,221,688, issued Sept. 9, 1980, which patent is hereby incorporated by reference to show curable anionic silicone emulsions which contain an organic tin compound and which cure to elastomers upon removal of the water at ambient temperatures and methods for their manufacture. The most preferred hydroxylated polydiorganosiloxanes are those prepared by the method of anionic emulsion polymerization described by Findley et al. in U.S. Pat. No. 3,294,725, issued Dec. 27, 1966, which is hereby incorporated by reference to show the methods of polymerization and to show the hydroxylated polydiorganosiloxane in emulsion.

The method of this invention first prepares an anionic silicone emulsion which comprises a continuous aqueous phase and a dispersed phase of polydiorganosiloxane and an organic tin compound. The emulsion is of the type which provides an elastomeric product upon removal of the water from the emulsion after the emulsion has aged for a sufficient period of time. One method of preparing the emulsion is that taught in U.S. Pat. No. 4,221,688, incorporated herein, where a hydroxylated polydiorganosiloxane which contains about 2 silicon-bonded hydroxyls per molecule is emulsified using anionic surfactant and water. The preferred method for this step is that disclosed in U.S. Pat. No. 3,294,725, incorporated above, where an emulsion is prepared by emulsifying an organosiloxane in an aqueous medium in the presence of a compound of the formula $R'C_6H_4SO_3H$ wherein R' is a monovalent aliphatic hydrocarbon radical of at least 6 carbon atoms until the desired increase in molecular weight is obtained. The preferred weight average molecular weight is above 50,000 with a range of from 200,000 to 700,000 most preferred. The method of '688 then adds a colloidal silica and an organic tin compound and adjusts the pH of the resulting emulsion to a pH within the range of from 9 to 11.5 inclusive. The emulsion is then aged for a period of time to allow reaction between the ingredients. When the organic tin compound is a diorganotindicarboxylate in an amount of from 0.1 to 2 part by weight for each 100 parts by weight of the hydroxylated polydiorganosiloxane, the time required is about 1 to 3 days. Longer periods of time, 3 to 14 days, for example, are also acceptable because once the ingredients have reacted together to the point when an elastomer is formed upon removal of water, the emulsion will continue to give an elastomer upon removal of the water.

The method of this invention for improving the adhesion of silicone elastomers, obtained from emulsions, to a substrate makes use of an amine functional polydiorganosiloxane co-oligomer mixed into the silicone elastomeric emulsion. These amine functional polydiorganosiloxane co-oligomers, hereinafter referred to as co-oligomer, are short chain copolymers of a diorganosiloxane and an amine functional silane. The use of the co-oligomer as an adhesion additive has been found to be much more efficient than use of the amine functional silane itself. Research has shown that when a silane is added to the silicone emulsion it is predominently found in the water phase of the emulsion, with very little of it associated with the polymer micelles. On the other hand, the co-oligomer used in this invention is associated with the micelles of polydiorganosiloxane to a much larger degree. It has been found that the co-oligomer can impart cohesive adhesion of the silicone emulsion to substrates when added to the emulsion in very small amounts, as little as 0.02g of amine per 100 g of polydiorganosiloxane has been found to be sufficient. Because the co-oligomer has no groups which are reactive with the polydiorganosiloxane and because it is a low molecular weight polymer rather that a silane, it is thought that there is much less chance for the co-oligomer to cause changes in the shelf life or properties of the emulsion to which it is added than is true in the case of an addition of a silane.

A preferred amine functional polydiorganosiloxane co-oligomer is of the formula

where R is a monovalent alkyl radical of from 1 to 6 carbon atoms, x is from 1 to 250, and y is from 2 to 50. The preferred R is methyl radical. The amine functional polydiorganosiloxane co-oligomer can be prepared by the copolymerization of a low molecular weight hydroxy endblocked polydiorganosiloxane and an amine functional dialkoxy silane with an alkaline polymerization catalyst such as potassium hydroxide. After polymerization, the co-oligomer is neutralized and filtered to give a product suitable for this invention. The co-oligomer is used at a level of from 0.01 to 0.5 part by weight per 100 parts by weight of an anionically polymerized polydiorganosiloxane in the form of an emulsion. It is possible to use more of the co-oligomer than this but it is not necessary, the preferred amount is from 0.01 to 0.05 part. Using this method of obtaining the co-oligomer, in a series of experiments, gave a range of co-oligomer viscosities varying from about 75 micrometres2/sec. (75 centistokes) to 20,000 micrometres 2/sec. (20,000 centistokes) with the minimum viscosity at about a molar ratio of 5 mol of amine to 95 mole of dimethyl, or a ratio of x to y of 95 to 5. A preferred procedure is to produce a co-oligomer at the 95 to 5 ratio and then blend it with a polydimethylsiloxane fluid to obtain lower ratios of amine to dimethyl. This procedure gives the desired amount of amine with a minimum viscosity for the blend.

Emulsions produced following the method of this invention can also contain other ingredients such as thickeners, antifoam, fillers, pigments, and additives, such as heat stability additives, useful with silicone elastomers.

By admixing reinforcing and/or extending filler into the emulsion, the viscosity of the emulsion can be raised so that the product is a paste. A paste is herein defined as a uniform mixture having a viscosity high enough so that it does not flow when placed upon a surface and low enough so that it can be extruded from a storage container. Such a product is particularly useful as a caulking material. The emulsion is stored in the familiar sealed cartridge which prevents evaporation of the water. At the time of use, the cartridge is opened at the discharge nozzle and the emulsion extruded out into the space to be filled, such as a joint in a building. The emulsion, in paste form, will adhere to the sides of the space and not flow out of the joint. The water then evaporates, leaving an elastomer bonded to the sides of the joint. In such applications, it is desirable that the elastomer have a high elongation and low modulus so that the bond to the sides of the joint is not stressed excessively upon movement of the joint.

The following examples are presented for purposes of illustrating this invention and should not be construed as limiting the scope of the invention which is properly delineated in the claims.

EXAMPLES

A series of materials were prepared for subsequent use in conjunction with an anionic emulsified polydimethylsiloxane to evaluate their usefulness in improving adhesion.

A 5 liter flask was equipped with an air driven stirrer, thermometer and vacuum distillation head. The flask was loaded with a crude monomer of the formula Me(MeO)$_2$SiCH$_2$(CH$_3$)CHCH$_2$NHCH$_2$CH$_2$NH$_2$, which was then distilled under a pressure of 667 pascal (vacuum of 5 mm of mercury) with a head temperature of 124° C. and a pot temperature of 130° C. The product was about 90 percent by weight of the indicated monomer with a lower boiling contaminant. This material will be referred to as monomer.

A 5 liter flask was equipped with an air driven stirrer, thermometer, nitrogen purge tube, and Dean-Stark water trap and condenser. The flask was loaded with 300 g (1.364 mols) of the above monomer which contained 2.73 mol of methoxy radical. Then 2.73 mol of water was stirred in. The mixture reacted and the temperature rose from 22° C. to 62° C. The mixture was then heated to reflux for 3 hours and 40 minutes, removing 50 g of volatiles. The product was stripped under a pressure of 4660 pascal (vacuum of 35 mm of mercury) to a temperature of 110° C. The product is hydrolyzed monomer, hyd mon.

A mixture was prepared by stirring 60 g of monomer and 60 g of distilled water for a period of two hours before use. This is monomer/water mixture, mon/H$_2$O.

A 5 liter flask was equipped with an air driven stirrer, thermometer, nitrogen purge tube, and Dean-Stark water trap and condenser. The flask was loaded with 3866.5 g of low molecular weight hydroxy endblocked polydimethylsiloxane and 605 g of monomer. This was a molar ratio of 95 to 5. With stirring and a nitrogen purge, 1.43 g of a 50% mixture of sodium hydroxide and water was added. The pot temperature was slowly raised to remove volatiles. After 3.5 hours, 72.1 g of volatiles had been collected and the temperature was 112° C. Then 0.7 g of sodium bicarbonate was added to neutralize, with stirring and cooling over a 2 hour period. Then the contents were heated to 110° C. under a pressure of 6667 pascal (50 mm of mercury vacuum) to remove volatiles (none were collected) and cooled to room temperature. After filtration through perlite, the product was a clear fluid with a viscosity of 70 micrometres 2/sec (70 centistokes) and an amine mol equivalent of 1.773. This product is referred to as co-oligomer, cool. This is an example of the amine functional polydiorganosiloxane oligomer of this invention. It is estimated that x is about 48 and y is about 2 in this co-oligomer.

A series of mixtures were prepared by mixing quantities of the co-oligomer, which has 5 mol percent amine, with the low molecular weight hydroxy endblocked polydimethylsiloxane to give blends having 0.5, 1.0, and 2.0 mol percent amine. These are referred to as blends.

An emulsion was prepared using the co-oligomer by adding 200 g of the co-oligomer to a solution of 37.5 g of a 30 percent solution of sodium lauryl sulfate in water in 467 g of distilled water by stirring for one half hour, then passing through a Gaulin single stage homogenizer at 20.7 MPa (3000 psi) and repeating with a second pass at 48.3 MPa (7000 psi). This is referred to as co-oligomer emulsion, cool E.

Emulsions of the blends were prepared by mixing 250 g of each blend with a solution of 167 g of distilled water and 37.5 g of the 30 percent solution of sodium lauryl sulfate in water, then emulsifying as in the previous preparation. These are referred to as blend emulsions, blend E.

EXAMPLE 1

First, an emulsion of an emulsion polymerized, hydroxy endblocked polydimethylsiloxane having a weight average molecular weight of about 325,000 was prepared. The emulsion was prepared by mixing 54 parts of water, 100 parts of low molecular weight, linear, hydroxy endblocked polydimethylsiloxane fluid, and 4 parts of surfactant consisting of a 30 percent by weight sodium lauryl sulfate in water, and them homogenizing the mixture. The emulsion was mixed with 1 part of dodecylbenzene sulfonic acid and allowed to polymerize, then made basic by adding 0.5 part of 50 percent by weight aqueous diethylamine. The emulsion had a pH of about 10 and a solids content of about 60 percent by weight.

A silicone base emulsion was prepared by mixing 4.14 parts of an aqueous sodium stabilized colloidal silica having a solids content of 50 percent by weight with 3.11 parts of 2-amino-2-methyl-1-propanol, then stirring in 89.09 parts of the above emulsion, followed by 0.16 part of antifoam of 35 percent solids polydimethylsiloxane/silica mixture, 0.26 part of ethylene glycol, 0.52 part of 30 percent solids acrylic thickening agent, 2.59 part of a 76 percent solids slurry of titanium dioxide, and 0.13 part of 50 percent solids by weight emulsion of dioctyltindilaurate; the emulsion having a solids content of about 58 percent by weight and a pH of about 11.

A series of silicone sealants were then prepared from the above base emulsion and the additives described above. In each example, 54.3 g of the above base emulsion was mixed with sufficient additive to give the amount of monomer, or the amount of additive required to give the equivalent amount of amine functionality, shown in the Table for one minute, then 45.7 g of calcium carbonate was added and mixed for 5 minutes. The sample was then removed from the mixing container, placed in an 8 ounce glass bottle and evacuated in a vacuum chamber under a pressure of 20 kPa (vacuum of 25 inches of water) to remove air and volatiles.

After aging the sealant samples for 24 hours, adhesion samples were prepared by coating a layer of sealant about 3.2 mm thick on a piece of yellow pine, imbedding a 25 by 100 mm piece of stainless steel screen that had been treated with a primer into the surface to provide reinforcement, then applying another 25 mm thick layer of sealant over the screen. The sealant was allowed to dry for a period of 14 days. Then the force required to pull the layer of sealant from the surface of the wood panel at an angle of 180 degrees was measured with the peeling at a rate of 5 mm per minute. As the strip was being peeled off, a razor blade was used to cut through the sealant at an angle of 45 degrees to the wood surface to force the stress to be at the interface between the sealant and the wood. This procedure was repeated three times. The average of the force required to separate the sealant from the surface of the wood is recorded in the Table. The nature of the failure was also noted. If the sealant peeled from the wood surface without leaving any rubber on the surface, the failure was noted as an adhesive failure. If the entire surface of the wood had a coating of sealant adhered to it so that the failure was entirely within the sealant, the failure was noted as cohesive failure. An estimate was made of failures which varied in between as the percentage of the failure that was of the cohesive type, that is, how much of the surface had sealant adhered to it after the test.

The table shows that those additives which had the amine functionality present in the form of a co-oligomer of the monomer and a siloxane had the ability of providing high peel strength and cohesive type failure at much lower levels of use than did those additives which had the amine functionality present as a monomer or hydrolyzed monomer.

TABLE

| Additive | Mol Percent Amine* In Additive | Grams of Amine* Per 100 g Sealant | Peel Strength kN/m | Failure % Cohesive |
|---|---|---|---|---|
| monomer | 100 | 0.293 | 2.3 | 90 |
|  | 100 | 0.586 | 2.5 | 100 |
| monomer | 100 | 0.252 | 5.2 | 95 |
|  | 100 | 0.336 | 4.2 | 80 |
| hyd mon | 100 | 0.293 | 2.3 | 80 |
|  | 100 | 0.586 | 3.2 | 90 |
|  | 100 | 1.465 | 4.2 | 80 |
| mon/H$_2$O | 100 | 0.293 | 4.7 | 99 |
|  | 100 | 0.600 | 3.7 | 100 |
|  | 100 | 1.500 | 3.5 | 80 |
| cool | 5.0 | 0.279 | 5.6 | 98 |
|  | 5.0 | 0.6765 | 5.1 | 100 |
| blend | 0.5 | 0.0198 | 4.9 | 90 |
|  | 1.0 | 0.0396 | 3.9 | 90 |
|  | 2.0 | 0.0157 | 4.7 | 80 |
|  | 2.0 | 0.0793 | 3.3 | 98 |
| cool E | 5.0 | 0.0398 | 6.5 | 100 |
|  | 5.0 | 0.0792 | 3.7 | 85 |
|  | 5.0 | 0.1599 | 3.7 | 90 |
| blend E | 0.5 | 0.0198 | 5.4 | 100 |
|  | 1.0 | 0.0396 | 7.0 | 100 |
|  | 2.0 | 0.0792 | 4.7 | 90 |

*Amine as Me(MeO)$_2$SiCH$_2$(CH$_3$)CHCH$_2$NHCH$_2$CH$_2$NH$_2$

That which is claimed is:

1. A method of improving the adhesion of silicone elastomers, obtained from aqueous emulsion, to substrates comprising mixing
   (A) an anionically polymerized polydiorganosiloxane, in the form of an emulsion that cures into a silicone elastomer upon removal of the water, and
   (B) an amine functional polydiorganosiloxane co-oligomer of the formula

where R is a monovalent alkyl radical of from 1 to 6 carbon atoms, x is from 1 to 250, and y is from 2 to 50, then applying the mixture to a substrate and allowing to dry, to give a silicone elastomer adhered to the substrate in a cohesive manner.

2. A method of improving the adhesion of silicone elastomers, obtained from aqueous emulsion, to substrates comprising mixing
   (A) 100 parts by weight of an anionically polymerized polydiorganosiloxane, in the form of an emulsion that cures into a silicone elastomer upon removal of the water, and
   (B) from 0.01 to 0.5 parts by weight of an amine functional polydiorganosiloxane co-oligomer of the formula

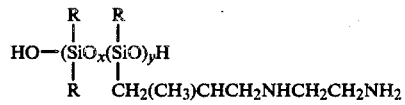

where R is a monovalent alkyl radical of from 1 to 6 carbon atoms, x is from 1 to 250, and y is from 2 to 50, then applying the mixture to a substrate and allowing to dry, to give a silicone elastomer adhered to the substrate in a cohesive manner.

3. The method of claim 1 in which the emulsion (A) comprises a silicone emulsion suitable to provide an elastomeric product upon removal of the water under ambient conditions comprising a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, said silicone emulsion having a pH in the range of 9 to 11.5 inclusive.

4. The method of claim 1 is which R is methyl radical.

5. The method of claim 1 in which (B) is in the form of an emulsion.

6. The silicone elastomer composition produced in the method of claim 1 by mixing (A) and (B).

* * * * *